United States Patent
Tsai et al.

(10) Patent No.: US 8,827,515 B2
(45) Date of Patent: Sep. 9, 2014

(54) BICYCLE DIRECTION LIGHT CONTROL SYSTEM AND METHOD THEREOF

(71) Applicant: Kinpo Electronics, Inc., New Taipei (TW)

(72) Inventors: Chia-Chin Tsai, New Taipei (TW); Wen-Hsin Lo, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 13/835,784

(22) Filed: Mar. 15, 2013

(65) Prior Publication Data

US 2014/0169011 A1    Jun. 19, 2014

(30) Foreign Application Priority Data

Dec. 18, 2012    (TW) .............................. 101147991 A

(51) Int. Cl.
*B62J 6/00*    (2006.01)

(52) U.S. Cl.
CPC ....................................... *B62J 6/005* (2013.01)
USPC ......................................... 362/473; 362/464

(58) Field of Classification Search
CPC ............................ F21V 21/084; F21V 23/0492
USPC .................... 362/103, 105, 473, 464
See application file for complete search history.

(56) References Cited

U.S. PATENT DOCUMENTS

| | | | |
|---|---|---|---|
| 5,910,764 A * | 6/1999 | Hayden | 340/479 |
| 6,406,168 B1 * | 6/2002 | Whiting | 362/473 |
| 8,269,619 B2 * | 9/2012 | Lee | 340/475 |
| 2004/0008106 A1 * | 1/2004 | Konczal | 340/432 |
| 2007/0247296 A1 * | 10/2007 | Moore et al. | 340/467 |
| 2013/0077290 A1 * | 3/2013 | HuiHui | 362/106 |

FOREIGN PATENT DOCUMENTS

| | | |
|---|---|---|
| JP | 2011-161959 | 8/2011 |
| TW | M376487 | 3/2010 |
| TW | M417298 | 12/2011 |

* cited by examiner

*Primary Examiner* — Evan Dzierzynski
(74) *Attorney, Agent, or Firm* — Li & Cai Intellectual Property (USA) Office

(57) ABSTRACT

The present invention discloses a bicycle direction light control system which may be installed on a bicycle and a head fitting. The system includes a sensing module and a direction light module. The sensing module can be installed on the head fitting for sensing the movement speed, turning angle and turning direction of the user's head. The direction light module is installed on the bicycle and faces towards the rear side of the bicycle. During the moving of the bicycle, when the sensing module senses that the turning angle of the user's head changes to a preset angular range within a sensing period, the direction light module turns on a corresponding indicator light according to the turning direction of the user's head.

25 Claims, 10 Drawing Sheets

BICYCLE DIRECTION LIGHT CONTROL SYSTEM AND METHOD THEREOF

CROSS-REFERENCE TO RELATED APPLICATION

This application claims the priority benefit of Taiwan application serial no. 101147991, filed on Dec. 18, 2012. The entirety of the above-mentioned patent application is hereby incorporated by reference herein and made a part of this specification.

BACKGROUND OF THE INVENTION

1. Field of the Invention

The present invention relates to a bicycle direction light control system and method thereof with automatic warning; in particular, to a bicycle direction light control system and method thereof with automatic pre-warning.

2. Description of Related Art

Recently, the price of crude oil has wildly increased and eco-consciousness is raised, such that more and more people use the bicycle to serve as the means of transportation in daily life. Nevertheless, the warning equipment (for example, car lamp, stop light, back view mirror, direction light, . . . etc.) is insufficient for a bicycle such that the peril of riding a bicycle on the road is higher than the peril of driving an automobile. In view of foregoing reason, more and more manufacturers join to design and produce the warning equipment for bicycles.

In the Taiwanese patent M417298, an apparatus for bicycle direction light is provided. The apparatus has a controllable steering mechanism which can automatically turn on the corresponding direction light when the bicycle makes a turn. Beside, in the Taiwanese patent M376487, a method is disclosed, in which an accelerometer is utilized to sense the acceleration and the angle variation of the bicycle and, under an intention of turning a direction, to transmit a wireless direction signal to a plurality of direction lights to drive the direction lights to send a warning signal for the user's turning direction. The above methods utilize the movement of the car-body turning to drive the steering direction lights. Nevertheless, the drawback of the abovementioned method for controlling the direction lights by means of the car-body turning is that each time the direction light is enabled only after the user makes a turn or when user makes a turn such that the pre-warning effect cannot be achieved. Such drawback reduces the effect of the direction light and causes the driver of the following car to have no enough time to response. In the Japanese patent JP2010-23583A, it discloses a method to trigger the left and right direction indicator by means of an image sensor to sense user's face. The method provided in the JP2010-23583A has a hidden drawback, that is, when the image sensing module, such as CCD/CMOS, is in a low-light condition, such as in night, the captured image has poor image quality, and misjudgment would occur. Even if the CCD/CMOS module adds IR function, misjudgment would also occur due to the fact that image gray scale distribution is too uniform. Moreover, the cost thereof is higher.

As such, applicant provides a bicycle direction light control system and a method thereof with automatic pre-warning. The direction light can be enabled at 10 to 20 meters before a turning point so that the pre-warning effect is achieved.

SUMMARY OF THE INVENTION

The object of the present invention is to provide a bicycle direction light control system and method thereof which can automatically control the direction lights to generate its corresponding indication light in accordance with the user's movement speed, turning angle and turning direction. The present invention is an intelligent direction light control system which can simplify user's operational flow chart, increase convenience, and also increase the effect of traffic safety.

In order to achieve the aforementioned objects, according to an embodiment of the present invention, a bicycle direction light control system is provided, which is suitable for a bicycle and a user's head fitting. The bicycle direction light control system includes a sensing module, disposed on the head fitting, for sensing a movement speed, a turning angle, and a turning direction of a user's head; and a direction light module, disposed on the bicycle and facing towards the back of the bicycle, wherein the direction light module turns on a corresponding indication light in accordance with a turning direction of the user's head when the sensing module senses the turning angle is changed from a forward direction angle range to a preset angle range by the user during a sensing period.

In accordance with an embodiment of the present invention, the direction light module includes: a second wireless transmission module, for receiving a sensing signal which corresponding to the movement speed, the turning angle, and the turning direction of the user's head; a control unit, coupled to the second wireless transmission module; a left direction light, coupled to the control unit; and a right direction light, coupled to the control unit, wherein the control unit controls the left direction light and the right direction light to generate the indication light in accordance with the turning direction of the user's head.

In accordance with an embodiment of the present invention, the direction light module turns on the left direction light and the right direction light when the sensing module senses that the user's head is from a moving state to a stopping state.

In accordance with an embodiment of the present invention, the direction light module controls the left direction light and the right direction light in accordance with the turning direction of the user's head when the sensing module senses that the user's head is from a stopping state to a moving state, wherein the direction light module disables the left direction light and the right direction light when the sensing module senses that the turning angle of the user's head is smaller than a lower threshold of the preset angle range during the sensing period.

In accordance with an embodiment of the present invention, the direction light module disables the left direction light and the right direction light when the sensing module senses that the user's head is from a stopping state to a moving state.

In accordance with an embodiment of the present invention, the direction light module disables the indication light when the sensing module senses that the turning angle of the user's head is smaller than a lower threshold of the preset angle range during the sensing period.

In accordance with an embodiment of the present invention, the direction light module disables the indication light when the sensing module senses that the turning angle of the user's head is larger than an upper threshold of the preset angle range during the sensing period.

In accordance with an embodiment of the present invention, the direction light module turns on a corresponding indication light or turns off a non-turning indication light in accordance with the turning direction of the user's head when the sensing module senses that the user's head is from a stopping state to a moving state and the turning angle of the user's head is larger than a lower threshold of the preset angle range during the sensing period.

In accordance with an embodiment of the present invention, the direction light module disables the indication light when the sensing module senses that the turning angle of the user's head is increased to be larger than an upper threshold of the preset angle range, and afterward the turning angle is reduced to be less than a lower threshold of the preset angle range.

In accordance with an embodiment of the present invention, the sensing module generates a plurality of acceleration sensing signal to sense the movement speed, the turning angle and the turning direction of the user's head.

In accordance with an embodiment of the present invention, the period of the sensing period is three seconds.

In accordance with an embodiment of the present invention, the preset angle range comprises a range between left turning 10 degree and left turning 45 degree, and a range between right turning 10 degree and right turning 45 degree, and the forward direction angle range comprises a range between left turning 10 degree and right turning 10 degree, and the head fitting is a safety helmet.

In accordance with an embodiment of the present invention, the sensing module determines whether the user performs an equipping action or a removing action of the head fitting in accordance with the movement speed and angle of the head fitting, wherein the sensing module enters into a normal mode from a standby mode when the sensing module senses the equipping action, and the sensing module enters into the standby mode from the normal mode when the sensing module senses the removing action.

In order to increase traffic safety of a bicycle running on a road, a method for controlling a bicycle direction light, suitable for a bicycle and a head fitting, wherein the method comprises the steps of: setting a sensing module on the head fitting for sensing a movement speed, a turning angle, and a turning direction of a user's head; and controlling a bicycle direction light in accordance with the movement speed, the turning angle and the turning direction of the user's head when the bicycle moves; wherein a direction light module turns on a corresponding indication light according to the user's turning direction when the sensing module senses the turning angle of the user's head is changed from the forward direction angle range to a preset angle range during a sensing period.

To sum up the above, the present invention can apply to a bicycle and a head fitting, and automatically control the direction lights to generate a corresponding indication light in accordance with the user's movement speed, turning angle and turning direction, and manual operation by a user is unnecessary, thus a corresponding turning light can be generated by the user of a bicycle. The present invention has the advantages of simplifying an operational flow chart, humanization and convenience.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
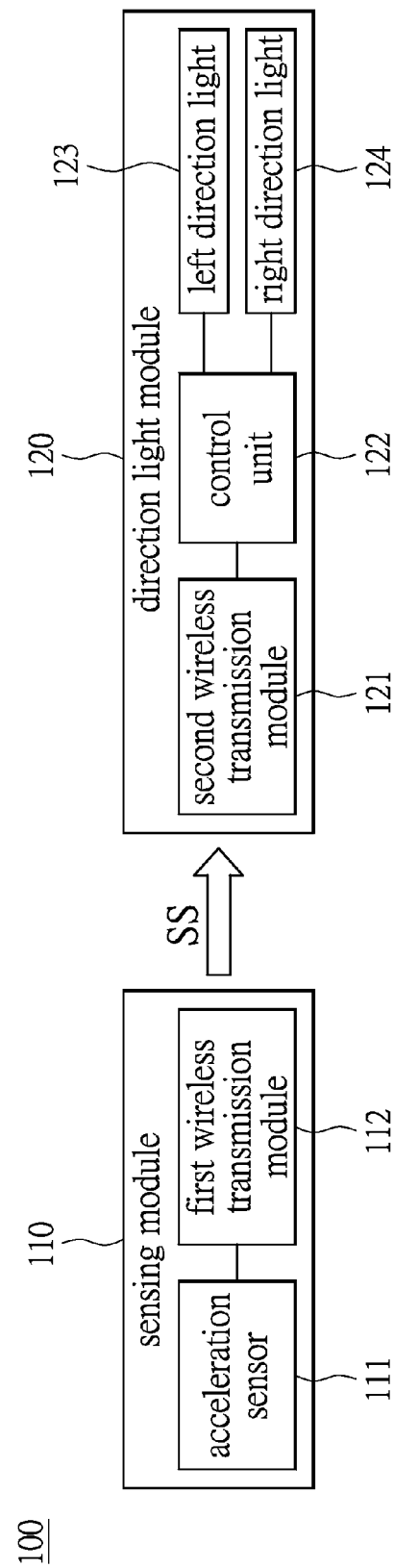
FIG. 1 shows a system block diagram depicting the structure of the bicycle direction light control system according to an embodiment of the present invention.

Refer to FIG. 1. FIG. 1 shows a system block diagram depicting the structure of the bicycle direction light control system according to an embodiment of the present invention. In the present embodiment, the bicycle direction light control system 100 can be disposed on the bicycle and a user's head fitting, and the system can control the direction light to generate a left turning light, a right turning light or a future turning light and so on in accordance with the movement speed, a turning angle and a turning direction of the user's head. User's head fitting may be a safety helmet, cap, glasses, goggles, or ornaments. The present invention is not limited thereto. The display mode for the light may be flickering or continuously lit. So long as the light can show the turning direction of the bicycle to the following vehicles, the display mode will not be limited in the present invention. The above-mentioned indication light may be constructed by one or more lights, such as left turning light and right turning light, wherein the left turning light and the right turning light can respectively include one or more light emitting element(s), such as LEDs. The left turning light and the right turning light of the present invention is not limited thereto.

The sensing module 110 includes an acceleration sensor 111 and a first wireless transmission module 112 which is coupled to the acceleration sensor 111. The acceleration sensor 111 is used for sensing the movement speed, the turning angle, and the turning direction of the user's head. The first wireless transmission module 112 is coupled to the acceleration sensor 111, and is used for transmitting a sensing signal SS to the direction light module 120, wherein the sensing signal SS corresponds to the movement speed, the turning angle, and the turning direction of the user's head. The sensing module 110 can generate one or a plurality of acceleration sensing signal to sense the movement speed, the turning angle, and the turning direction of the user's head.

The direction light module 120 includes a second wireless transmission module 121, a control unit 122, a left direction light 123 and a right direction light 124. The second wireless transmission module 121 is used for receiving the sensing signal SS which corresponds to the movement speed, the turning angle and the turning direction of the user's head. The control unit 122 is coupled to the second wireless transmission module 121. The left direction light 123 and the right direction light 124 is coupled to the control unit 122 and controlled by the control unit 122, wherein the control unit 122 controls the left direction light 123 and the right direction light 124 to generate the corresponding indication light in accordance with the turning direction of the user's head.

Figure 2:
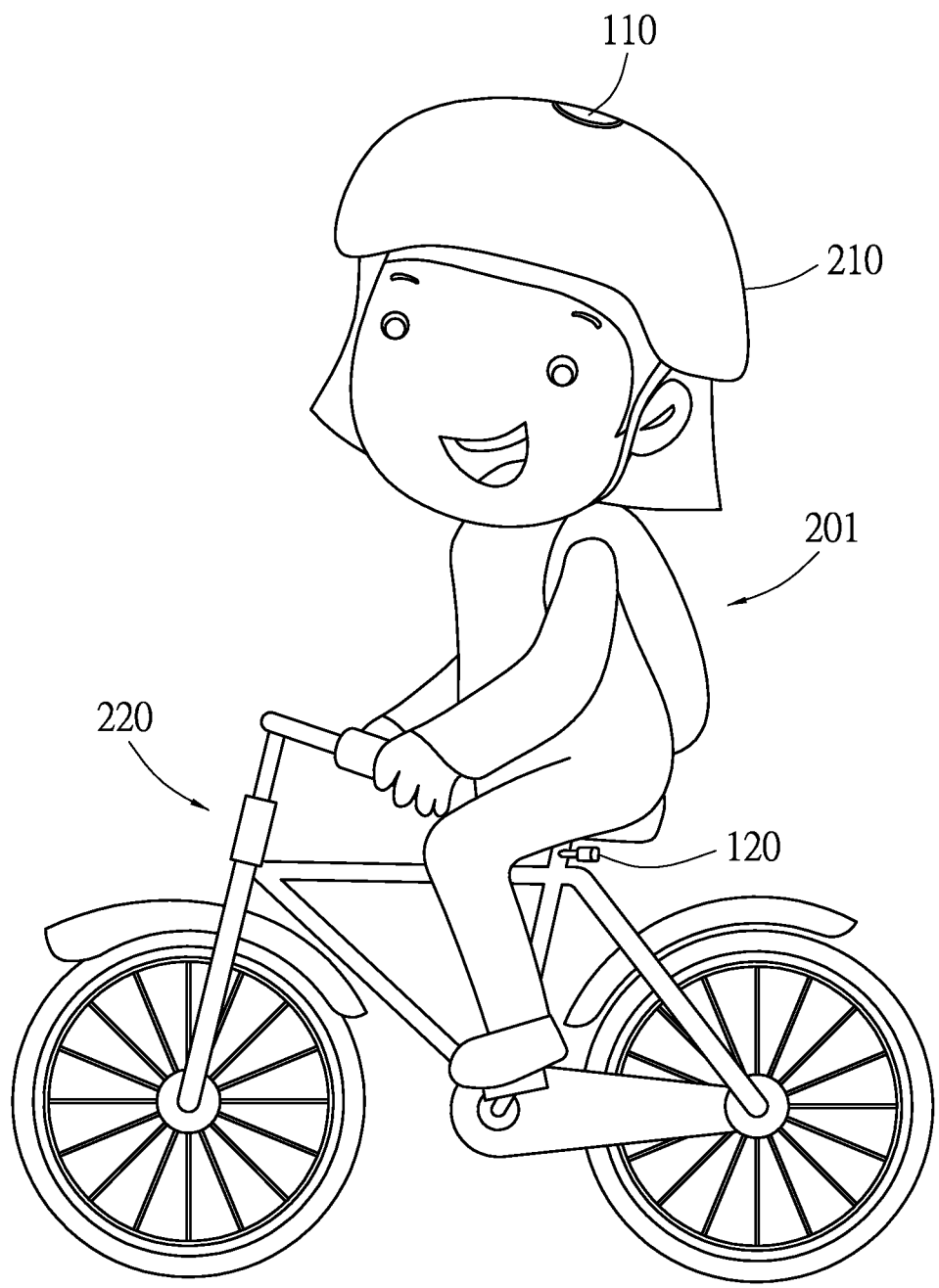
FIG. 2 shows a schematic diagram depicting the bicycle direction light control system according to an embodiment of the present invention.

Refer to FIG. 2. FIG. 2 shows a schematic diagram depicting the bicycle direction light control system according to an embodiment of the present invention. The bicycle direction light control system 100 includes a sensing module 110 and a direction light module 120, wherein the sensing module can be disposed on the head fitting 210 for sensing the movement speed, the turning angle, and the turning direction of the user's head. The direction light module 120 can be disposed on the bicycle 220 and face towards the rear of the bicycle 220. In the present embodiment, the head fitting 210 is taken as a safety helmet for an example. Nevertheless, the present invention is not limited thereto. When the bicycle 220 is moving forward and the sensing module 110 senses that the turning angle of the user's head is changed from the forward direction angle range to a preset angle range during a sensing period, the direction light module 120 turns on a corresponding indication light in accordance with a turning direction of the user's head.

In the present embodiment, the preset angle range includes the range of left turning angle and the right turning angle, that is, a rotation range. For example, the rotation range is from 10 degree to 45 degree, wherein 10 degree is a lower threshold, and 45 degree is an upper threshold. The abovementioned 10 degree to 45 degree is the preset angle range, which includes a range between left turning 10 degree and 45 degree, and a range between right turning 10 degree and 45 degree. In order to clearly describe the present embodiment, the left turning angle of the user's head is shown as a positive angle, and the right turning angle of the user's head is shown as a negative angle. In the present embodiment, for example, the preset angle range may include a range between left turning 10 degree and 45 degree, and a range between right turning 10 degree and 45 degree, while the forward direction angle range includes a range between left turning 10 degree and right turning 10 degree, wherein the preset angle range and the forward direction angle range does not overlap. For example, the forward direction angle range excludes the right turning 10 degree and the left turning 10 degree.

It is worth noting that the left turning angle may be represented as a positive angle, such as +10°, and the right turning angle may be represented as a negative angle, such as −10°. The abovementioned representation is only a mathematical representation. People having ordinary skill in the art can choose a representation suitable for operation according to requirement.

Figure 3:
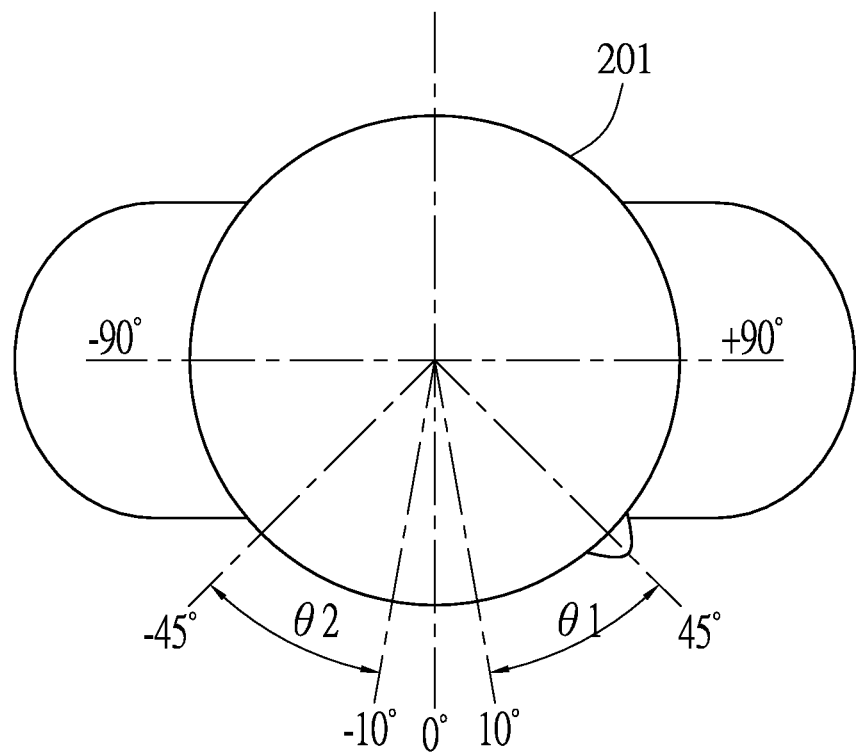
FIG. 3 shows a schematic diagram depicting the turning angle of a user's head according to an embodiment of the present invention.

Refer to FIG. 3. FIG. 3 shows a schematic diagram depicting the turning angle of user's head according to an embodiment of the present invention. $\Theta 1$ represents that the turning angle of user's head 201 is in the range between the left turning 10 degree and 45 degree. $\Theta 2$ represents that the turning angle of user's head 201 is in the range between the right turning 10 degree and 45 degree. The preset angle range in the present embodiment includes $\Theta 1$ and $\eta 2$. It is worth noting that the preset angle range can be defined according to user's requirement or situation, such as the range from 11 degree to 46 degree, or the range from 9 degree to 44 degree, or the range from 15 degree to 50 degree. The preset angle range of the present invention is not limited thereto. Nevertheless the range from 10 degree to 45 degree is served as an example of the present embodiment.

The sensing module 110 is disposed on the head fitting 210, such that the turning angle of user's head 201 can be detected. When the bicycle 220 controlled by user 201 is moving forward (i.e., the speed is not zero), and the sensing module 110 senses during a sensing period that the turning angle of the user's head 201 is changed from the forward direction angle range to a preset angle range, such as the range between the left turning angle 10 degree and 45 degree, the sensing module 110 would send its corresponding sensing signal SS to the direction light module 120. The direction light module 120 shows a left turning indication light (for example, flickering the left direction light 123) in accordance with a turning direction (left turning) of the user's head 201. On the contrary, when the sensing module 110 senses that the turning angle of the user's head 201 turns to the right angle between 10 degree and 45 degree, the sensing module 110 would send its corresponding sensing signal SS to the direction light module 120. The direction light module 120 shows a right turning indication light (for example, flickering the right direction light 124) in accordance with a turning direction (right turning) of the user's head 201.

In other words, when the sensing module 110 senses that the user 201 turns his/her head from the forward direction angle range, such as the range from left turning angle 10 degree to right turning angle 10 degree, to a preset angle range, it represents that user 201 may want to make a turn, then the control unit 122 in the direction light module 120 would turn on the corresponding indication light, which is left direction light 123 or right direction light 124, in accordance with the turning direction (left or right turning) of user's head 201. It is worth noting that the abovementioned sensing period may be three seconds. Nevertheless, the sensing period of the present invention is not limited thereto. The sensing period may be 3.1 seconds or 3.5 seconds, and can be designed according to requirement.

When the sensing module 110 senses during a sensing period that the turning angle of the user's head 201 is smaller than the lower threshold of the preset angle range (i.e., in the range between left turning angle 10 degree and right turning angle 10 degree), the direction light module 120 turns the left direction light 123 and the right direction light 124 off. In other words, when the turning angle of the user's head 201 is in the range between left turning angle 10 degree and right turning angle 10 degree (i.e., +10° to −10°), the direction light control system 100 determines that user 201 is normally moving forward, and his/her visual line faces to the front angle range. Thus, the direction light control system 100 would not enable the direction light (the left direction light 123 and the right direction light 124).

When the sensing module 110 senses during a sensing period that the turning angle of the user's head 201 is larger than the upper threshold of the preset angle range (for example, left turning over 45 degree (larger than 45 degree) or right turning over 45 degree (smaller than −45 degree)), the direction light module 120 turn the indication light off, that is, turn off the left direction light 123 and the right direction light 124. In the present embodiment, the direction light control system 100 determines that the abovementioned situation (the turning angle of the user's head 201 is larger than the upper threshold of the preset angle range) means that the user is watching the scene and not ready to turn.

Furthermore, when the sensing module 110 senses during the sensing period that the turning angle of the user's head 201 is increased to be larger than the upper threshold of the preset angle range, and afterward the turning angle of the user's head 201 is reduced to be less than the lower threshold of the preset angle range, the direction light module 120 turns the indication light off. For example, when the sensing module 110 senses during the sensing period that the turning angle of the user's head 201 turns to left angle or right angle 80 degree (might also be 75 degree), and then turns back to an angle within 10 degree (i.e., the front angle range), the direction light control system 100 determines that the user 201 may turn his/her head to watch the thing beside the road, thus the indication light for turning indication would not be turned on.

The indication of light would be also affected by the moving or stopping state of the user 201. When the sensing module 110 senses that the state of the user 201 is from a stopping state to a moving state, the direction light module 120 disables the left direction light 123 and the right direction light 124. When the sensing module 110 senses that the state of the user 201 is from a moving state to a stopping state, the direction light module 120 turns on the left direction light 123 and the right direction light 124.

Moreover, when the sensing module 110 senses that the state of the user 201 is from a stopping state to a moving state, the left direction light 123 and the right direction light 124 may be controlled according to the turning angle of the user's head 201 in the present embodiment. For example, when the sensing module 110 senses that the user 201 starts to move, and his/her head turns left to the angle 20 degree, the direction light module 120 would turn the right direction light 124 off and keep the flickering of the left direction light 123. On the contrary, when the user's head turns right to the angle 20 degree, the direction light module 120 would turn the left direction light 123 off and keep the flickering of the right direction light 124.

Besides, the sensing module 110 of the direction light control system 100 can detect whether the user 201 is equipped with the head fitting 210 or not and correspondingly perform the start-up or standby in accordance with the moving speed and angle of the head fitting 210. For example, when the acceleration sensor 111 senses that the head fitting 210 generates a large acceleration in the vertical direction, it might indicate that the user performs an equipping action or a removing action of the head fitting 210.

When the head fitting 210 turns over from upper side to lower side, the direction light control system 100 determines that this action is a removing action, at this moment the system would enter into the standby mode or a sleep mode to save power. When the head fitting 210 turns over from the lower side to the upper side, the direction light control system 100 determines that this action is an equipping action, the system would enter into a normal mode to prepare to control the direction light.

In other words, in the present embodiment, when the rider takes up the head fitting 210 and then puts on the head fitting 210 to be ready for driving the bicycle 220, the acceleration sensor 111 would detect an acceleration alteration curve with a special characteristic and the curve maintains for a section of time. Thus after the sensing module 110 senses the curve, the bicycle direction light control system 100 would turn on all the powers after waiting for about 20 seconds. Similarly, when the rider takes off and places the head fitting 210 to stop riding the bicycle 220, the acceleration sensor 111 would detect an acceleration alteration curve with another special characteristic and the curve maintains for a section of time. Thus after the sensing module 110 senses the curve, the bicycle direction light control system 100 would enter into a power saving mode after waiting for about 5 to 10 seconds.

Figure 4A:
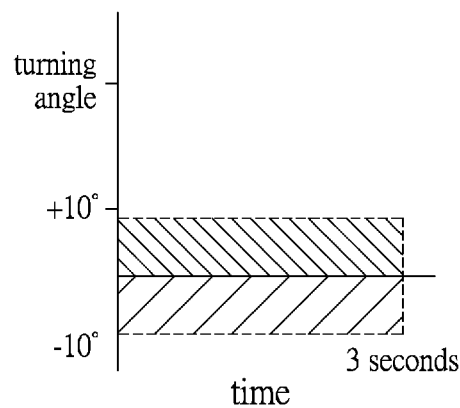
FIGS. 4A~4D show a schematic diagram depicting the variation of turning angle of a user's head with respect to time according to an embodiment of the present invention.
Figure 4B:
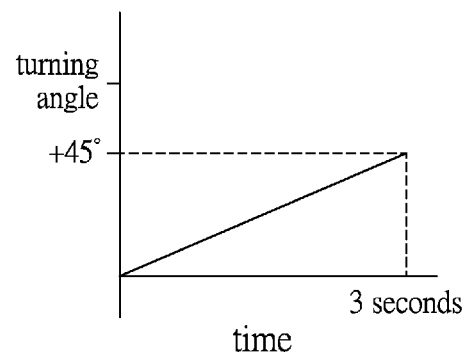

Next, several figures would be taken to describe head-turning behaviors of some users. Referring to FIGS. 4A~4D. FIGS. 4A~4D show some schematic diagrams depicting the variation of turning angle of user's head with respect to time according to an embodiment of the present invention. As shown in FIGS. 4A~4D, several possible head's behaviors are induced and ascertained. As shown in FIG. 4A, it shows the head's action when the user normally rides the bicycle. When the turning angle of the user's head is within ±10 degree (left turning 10 degree to right turning 10 degree), then the turning angle of the user's head in a moving state is always in the above angle range. As shown in FIG. 4B, generally, when a rider of a bicycle turns his/her head right or left to watch some static objects, such as a turning corner, the turning time of the user's head would continue until the bicycle is close to the turning corner. Or, when the rider of bicycle stops riding (waiting for turning), sometimes he/she may turn his/her head to watch some static objects. When the rider stops the bicycle at road side, then before continuing to ride, his/her head would firstly turn to the to-be-passed road to watch for a while and then the rider start to ride the bicycle.

Figure 4C:
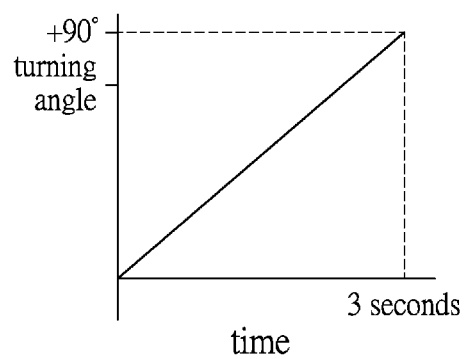

During three seconds, the turning angle of the user's head is in the range from 0 to +45 or from 0 to −45 degree, and the user's moving state is always in the abovementioned angle, wherein the 0 degree error is in a range between 10 and −10 degree. As shown in FIG. 4C, it shows that a general rider of bicycle turns his/her head right or left during riding the bicycle to watch some static or dynamic objects, such as people, animal, car, building and so on, and the turning time of the user's head would remain for a section of time (since in moving, the bicycle 220 is a moving object). Or, the rider of a bicycle stops riding (waiting for turning), sometimes he/she may turn his/her head to watch some dynamic or static objects. For example, if the rider stops riding, then before continuing to ride the bicycle, he/she would turn his/her head to watch whether there is a car coming from rear side or not, wherein the turning time of the user's head would remain for a section of time, and the head would turn back until there is no car coming from rear side or when the car coming from rear side is far from the user.

Figure 4D:
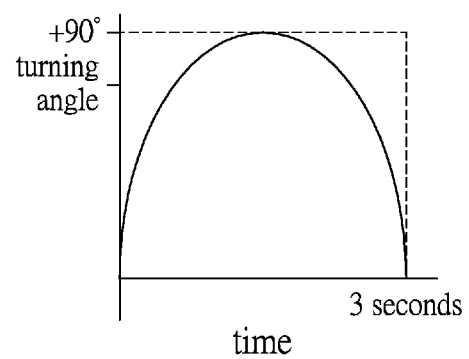

During three seconds, the turning angle of the user's head is in the range from 0 to larger than +45 or from 0 to smaller than −45 degree, and the user's moving state is always in the abovementioned angle, wherein the 0 degree error is in a range between 10 and −10 degree. As shown in FIG. 4D, when a rider rides the bicycle, he/she may turns his/her head to watch the rear side, and the turning time will not remain too long, so as to ascertain whether there are cars coming from the rear side; or, when a rider rides the bicycle, he/she may turn his/her head to watch some dynamic or static objects, such as people, animal, car, building or turning corner and so on, and the turning time will not remain too long. During three seconds, the turning angle is in the range from 0 to +90 degree or from 0 degree to −90 degree, afterward the user turns his/her head to the forward direction angle range, i.e., ±10 degree, wherein the 0 degree error is in a range between 10 and −10 degree.

Figure 5:
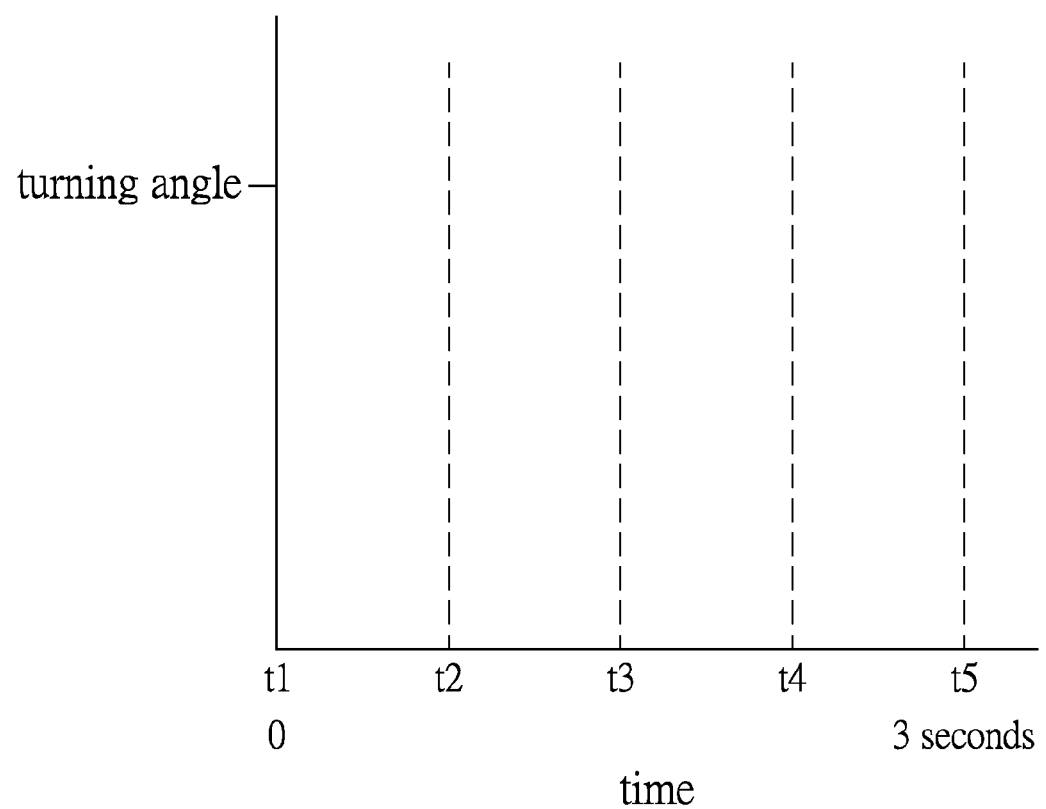
FIG. 5 shows a schematic diagram depicting the sampling and the determination in accordance with the curve of the variation of turning angle of a user's head with respect to time according to an embodiment of the present invention.

In an embodiment of the present invention, in order to rapidly determine the four states shown in FIG. 4A~FIG. 4D, please refer to FIG. 5. FIG. 5 shows a schematic diagram depicting the sampling and the determination in accordance with the curve of the variation of turning angle of user's head with respect to time according to an embodiment of the present invention. In order to conveniently determine the categories of the variations of turning angle with respect to time, the time period from 0 to 3 seconds is divided uniformly into five time scales, which is t1, t2, t3, t4 and t5 sequentially, wherein t1=0 second and t5=3 seconds. When the angle in t3>the angle in t4>the angle in t5 and the angle in t3>the angle in t2>the angle in t1, it represents that the curve is a parabola. Regarding the sampling method for the state in FIG. 4A, the turning angle detected by the acceleration sensor 111 is sampled every 0.1 seconds, and it is determined whether the turning angle samples obtained within 3 seconds are in the range between +10 and −10 degree. If so, it represents that the state belongs to the state in FIG. 4A.

Regarding the sampling method for the state in FIG. 4B, the turning angle detected by the acceleration sensor 111 is sampled every 0.1 seconds, and it is determined whether the turning angle samples obtained within 3 seconds are in the range between +45 and −45 degree. If so, it is determined whether the angles obtained from the sample data in t1, t2, t3, t4, t5 conform to "the angle in t3>the angle in t4>the angle in t5 and the angle in t3>the angle in t2>the angle in t1". If not, the state belongs to the state in FIG. 4B.

Regarding the sampling method for the state in FIG. 4C, the turning angle detected by the acceleration sensor 111 is sampled every 0.1 seconds, and it is determined whether the turning angle samples obtained within 3 seconds are in the range between +90 and −90 degree. If so, it is determined whether the angles obtained from the sample data in t1, t2, t3, t4, t5 conform to "the angle in t3>the angle in t4>the angle in t5 and the angle in t3>the angle in t2>the angle in t1". If not, the state belongs to the state in FIG. 4C. Regarding the sampling method for the state in FIG. 4D, the turning angle detected by the acceleration sensor 111 is sampled every 0.1 seconds, and it is determined whether the turning angle samples obtained within 3 seconds are in the range between +90 and −90 degree. If so, it is determined whether the angles obtained from the sample data in t1, t2, t3, t4, t5 conform to "the angle in t3>the angle in t4>the angle in t5 and the angle in t3>the angle in t2>the angle in t1". If so, the state belongs to the state in FIG. 4D.

In FIGS. 4A~4D, the state in FIG. 4A represents that the turning angle of the user's head 201 is smaller than the lower threshold of the preset angle range during the sensing period; the state in FIG. 4B represents that the turning angle of the user's head 201 is changed from a forward direction angle range to the preset angle range during the sensing period; the state in FIG. 4C represents that the turning angle of the user's head 201 is changed from the forward direction angle range to be larger than the upper threshold of the preset angle range during the sensing period; the state in FIG. 4D represents that the turning angle of the user's head increases to be larger than an upper threshold of the preset angle range, and afterward the turning angle of the user's head is changed to be smaller than a lower threshold of the preset angle range. In the present embodiment, the direction light control system 100 uses the abovementioned curves in FIGS. 4~4D to determine the turning type of the user's head 201, and accordingly to control the left direction light 123 and the right direction light 124 in the direction light module 120.

Figure 6:
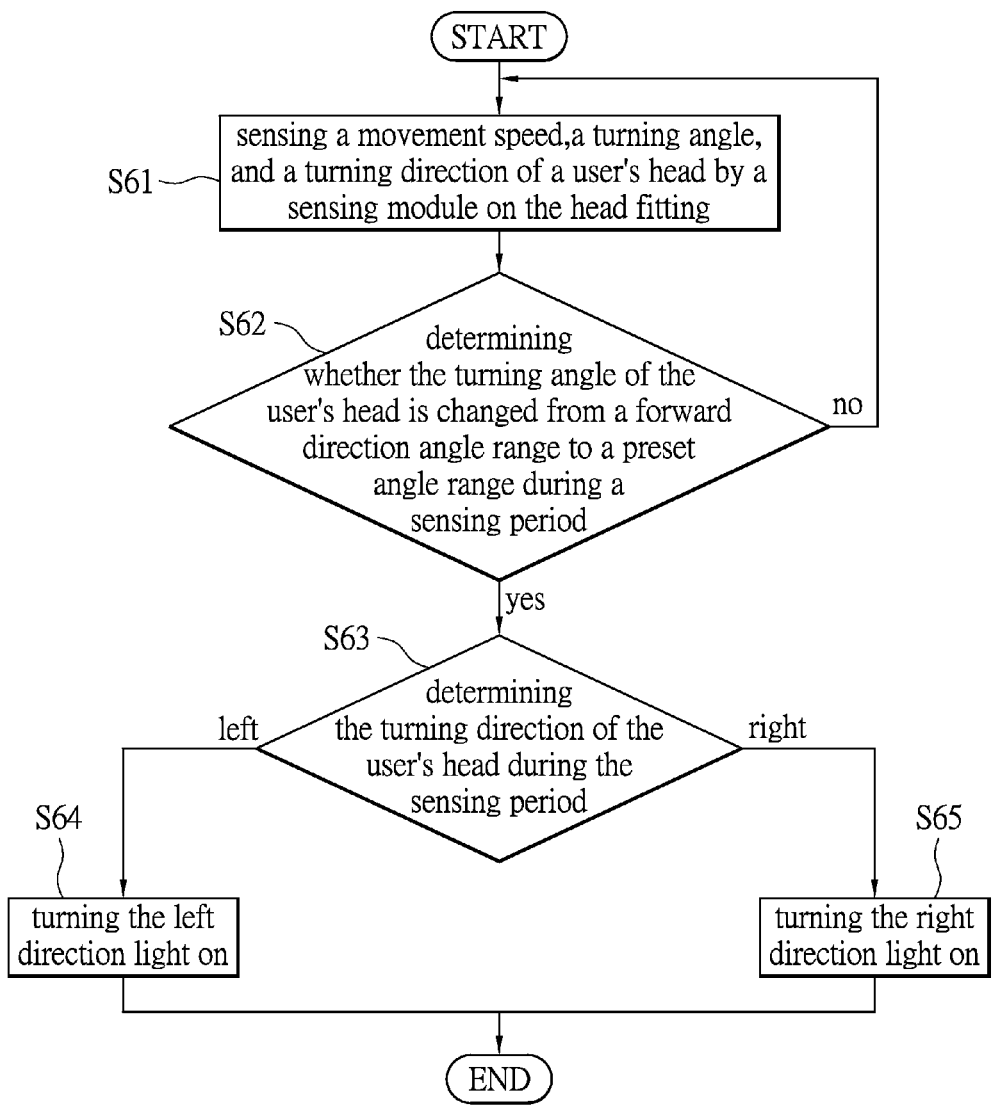
FIG. 6 shows a flow chart depicting the method for controlling a bicycle direction light according to an embodiment of the present invention.

FIG. 6 shows a flow chart depicting the method for controlling a bicycle direction light according to an embodiment of the present invention. First, in step S61, the sensing module 110 on the head fitting 210 senses a movement speed, a turning angle, and a turning direction of the user's head. Afterward, step S62 is performed to determine whether the turning angle of the user's head 201 is changed from a forward direction angle range to a preset angle range during a sensing period. If not, go back to START; if so, step S63 is performed. In step S63, it is determined that the turning direction of the user's head 201 during the sensing period. If the determination thereof is left, step S64 is performed to turn the left direction light 123 on; if the determination thereof is right, step S65 is performed to turn the right direction light 124 on. The display mode for the light may be flickering or continuously lit. The display mode is also not limited in the present invention, so long as the light can show the turning direction of the bicycle to the following vehicles.

Figure 7:
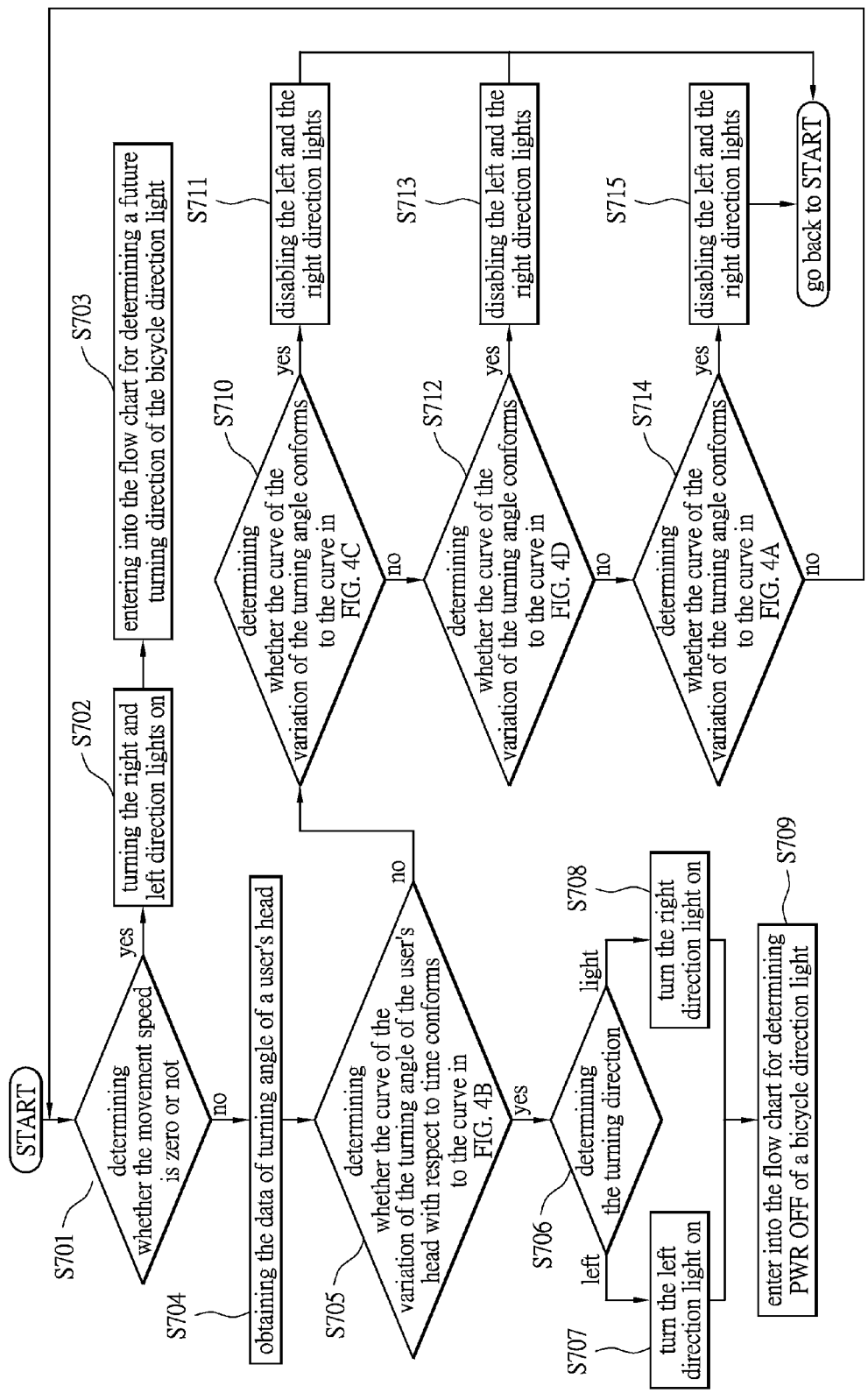
FIG. 7 shows a flow chart for determining PWR ON of a bicycle direction light according to an embodiment of the present invention.

FIG. 7 shows a flow chart depicting the method for determining PWR ON of a bicycle direction light according to an embodiment of the present invention. First, step S701 is performed to determine whether the movement speed is zero or not. If so, step S702 is performed to turn the right and the left direction lights on. Afterward, step S703 is performed to enter into the flow chart for determining a future turning direction of the bicycle. If the determination in step S701 is negative, step S704 is performed to obtain the data of the turning angle of user's head.

Next, step S705 is performed to determine whether the curve corresponding to the variation of the turning angle of head with respect to time conforms to the curve in FIG. 4B. If so, step S706 is performed to determine the turning direction of user's head. If the determination of step S706 is left, step S707 is performed to turn the left direction light 123 on. If the determination of step S706 is right, step S708 is performed to turn the right direction light 124 on. After step S707 or step S708, step S709 is performed to enter into the flow chart for determining PWR OFF of the bicycle direction light.

If the determination of step S705 is negative, step S710 is performed to determine whether the curve corresponding to the variation of the turning angle conforms to the curve in FIG. 4C. If the determination of step S710 is positive, step S711 is performed to disable the left and the right direction lights and then back to START. If the determination of step S710 is negative, step S712 is performed to determine whether the curve corresponding to the variation of the turning angle conforms to the curve in FIG. 4D. If the determination of step S712 is positive, step S713 is performed to disable the left and the right direction lights and then back to START. If the determination of step S712 is negative, step S714 is performed to determine whether the curve corresponding to the variation of the turning angle conforms to the curve in FIG. 4A. If the determination of step S714 is positive, step S715 is performed to disable the left and the right direction lights and then back to START. If the determination of step S714 is negative, go back to START.

Figure 8:
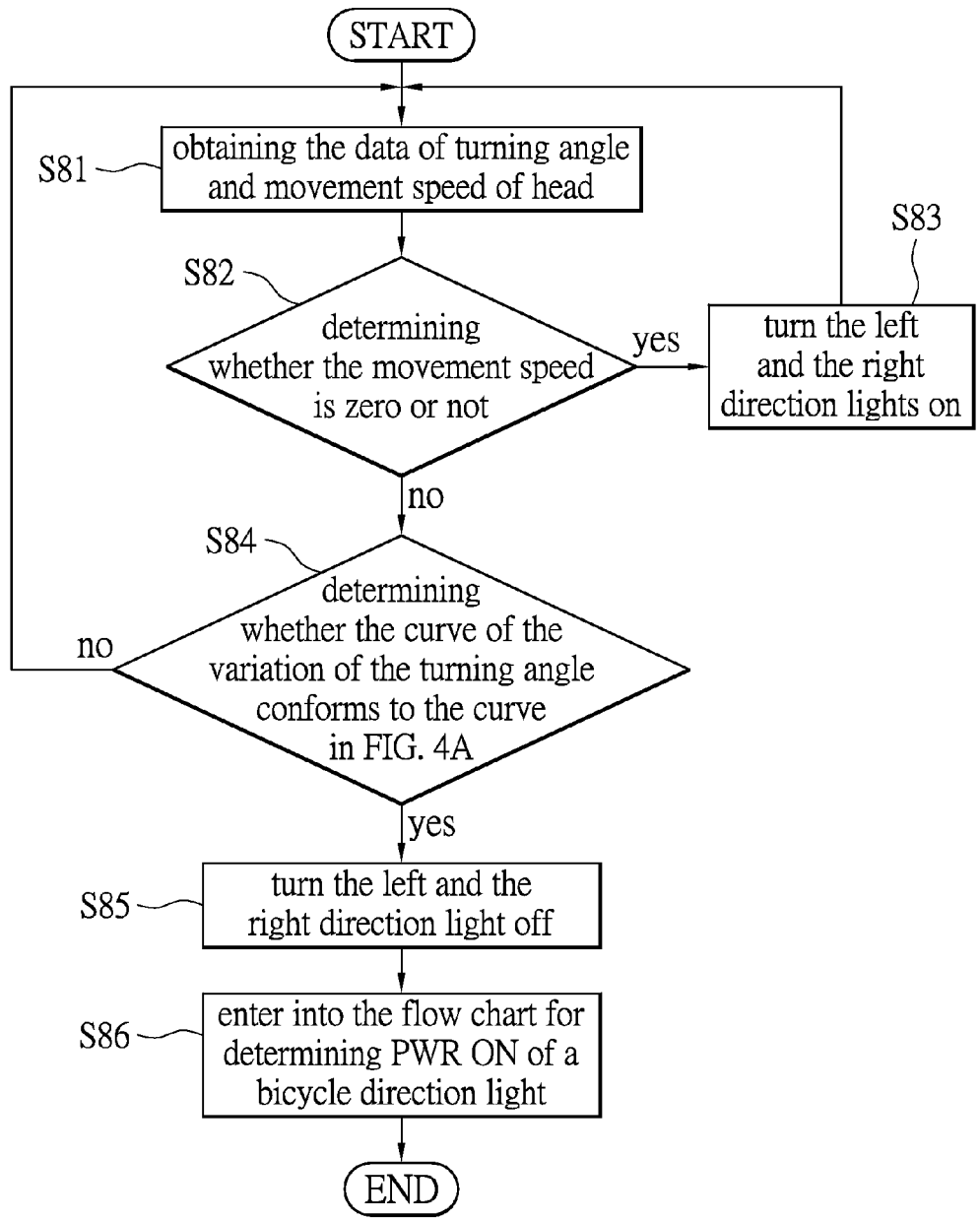
FIG. 8 shows a flow chart for determining PWR OFF of a bicycle direction light according to an embodiment of the present invention.

FIG. 8 shows a flow chart for determining PWR OFF of a bicycle direction light according to an embodiment of the present invention. First, step S81 is performed to obtain the data of turning angle and movement speed of a user's head. Afterwards, step S82 is performed to determine whether the movement speed is zero or not. If so, step S83 is performed to turn the left and the right direction lights on and then back to START. If not, step S84 is performed to determine the curve corresponding to the variation of the turning angle conforms to the curve in FIG. 4A. If the determination of step S84 is negative, go back to START. If the determination of step S84 is positive, step S85 is performed to turn the left and the right direction light off. Next, step S86 is performed to enter into the flow chart for determining PWR ON of the bicycle direction light.

Figure 9:
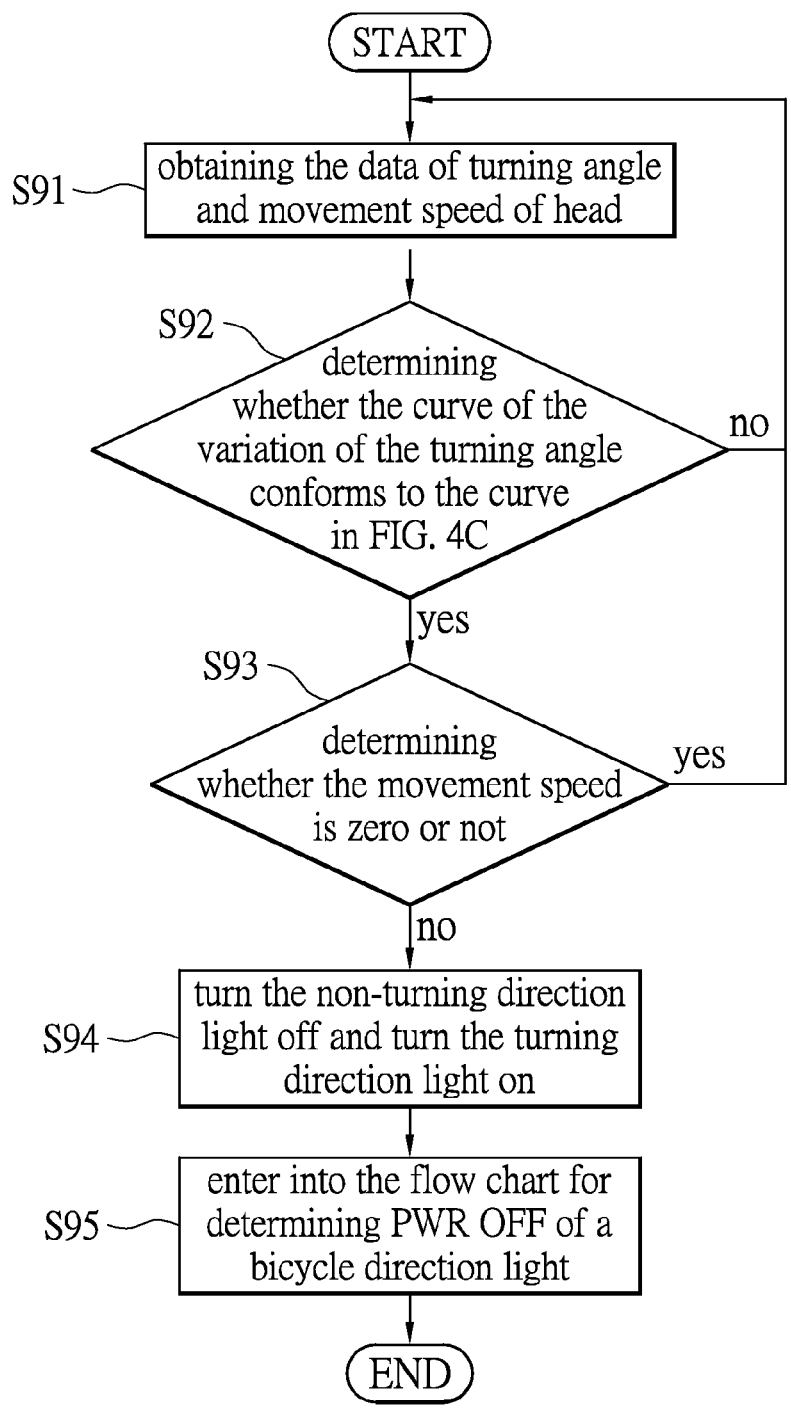
FIG. 9 shows a flow chart for determining a future turning direction of a bicycle direction light according to an embodiment of the present invention.

FIG. 9 shows a flow chart for determining a future turning direction of a bicycle direction light according to an embodiment of the present invention. First, step S91 is performed to obtain the data of turning angle and movement speed. Afterward, step S92 is performed to determine whether the curve corresponding to the variation of the turning angle conforms to the curve in FIG. 4C. If not, go back to START. If so, step S93 is performed to determine whether the movement speed is zero or not. If the determination of step S93 is positive, go back to START. If the determination of step S93 is negative, step S94 is performed to turn the non-turning direction light off and turn the turning direction light on. Next, step S95 is performed to enter into the flow chart for determining PWR OFF of the bicycle direction light.

Figure 10:
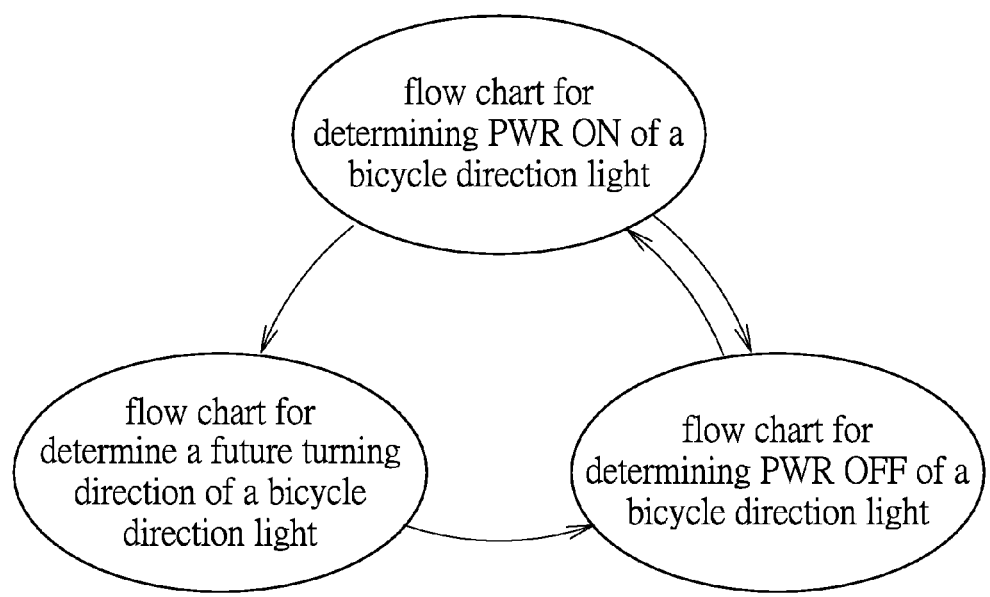
FIG. 10 shows a state diagram depicting the determination flow chart for the bicycle direction light control system according to an embodiment of the present invention.

FIG. 10 shows a state diagram depicting the determination flow chart for the bicycle direction light control system according to an embodiment of the present invention. As shown in FIG. 10, the relationship between the flow chart for determining PWR ON, the flow chart for determining PWR OFF and the flow chart for determine a future turning direction of a bicycle direction light can be represented by FIG. 10. The bicycle direction light control system 100 would switch over among the three flow charts according to the arrow of the state diagram in FIG. 10. To switch over among the three flow charts is performed in accordance with the turning angle, the turning direction and the movement speed of the user's head 201.

It is worth noting that the detail of the method in the abovementioned embodiments can refer to the embodiment of the control system provided in FIGS. 1~5 and their corresponding descriptions. People having ordinary skill in the art would obtain the detail of the method in the abovementioned embodiment according to the descriptions of the system embodiments corresponding to FIGS. 1~5. Thus, the detailed description is omitted.

To sum up the above, the present invention can apply to a bicycle and a head fitting, and the turning variation of the user's head can be directly sensed. The direction lights can be automatically controlled to display a corresponding light in accordance with the user's movement speed, turning angle and turning direction, and manual control by user is unnecessary. The present invention simplifies the control flow of direction lights and thus the traffic safety of a bicycle is accordingly enhanced.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A control system for bicycle direction light, suitable for being disposed on a bicycle and a head fitting, wherein the control system comprises:
   a sensing module, disposed on the head fitting, for sensing a movement speed, a turning angle, and a turning direction of a user's head; and
   a direction light module, disposed on the bicycle and facing towards the back of the bicycle,
   wherein the direction light module turns on a corresponding indication light in accordance with the turning direction of the user's head when the bicycle is moving and the sensing module senses that the turning angle of the user's head is changed from a forward direction angle range to a preset angle range during a sensing period;
   wherein the sensing module determines whether the user performs an equipping action or a removing action in accordance with the movement speed and angle of the head fitting, wherein the sensing module enters from a standby mode into a normal mode when the sensing module senses the equipping action, and the sensing module enters from the normal mode into the standby mode when the sensing module senses the removing action.

2. The control system for bicycle direction light according to claim 1, wherein the sensing module comprises:
   an acceleration sensor, used for sensing the movement speed, the turning angle, and the turning direction of the user's head; and
   a first wireless transmission module, coupled to the acceleration sensor and used for transmitting a sensing signal to the direction light module, wherein the sensing signal corresponds to the movement speed, the turning angle, and the turning direction of the user's head.

3. The control system for bicycle direction light according to claim 1, wherein the direction light module comprises:
   a second wireless transmission module, for receiving a sensing signal corresponding to the movement speed, the turning angle, and the turning direction of the user's head;
   a control unit, coupled to the second wireless transmission module;
   a left direction light, coupled to the control unit; and
   a right direction light, coupled to the control unit,
   wherein the control unit controls the left direction light and the right direction light to generate the indication light in accordance with the turning direction of the user's head.

4. The control system for bicycle direction light according to claim 3, wherein the direction light module turns on the left direction light and the right direction light when the sensing module senses that the user is from a moving state to a stopping state.

5. The control system for bicycle direction light according to claim 3, wherein the direction light module controls the left direction light and the right direction light in accordance with the turning angle of the user's head when the sensing module senses that the user is from a stopping state to a moving state, wherein the direction light module disables the left direction light and the right direction light when the sensing module senses that the turning angle of the user's head is smaller than a lower threshold of the preset angle range during the sensing period.

6. The control system for bicycle direction light according to claim 3, wherein the direction light module disables the left direction light and the right direction light when the sensing module senses that the user is from a stopping state to a moving state.

7. The control system for bicycle direction light according to claim 1, wherein the direction light module disables the indication light when the sensing module senses that the turning angle of the user's head is smaller than a lower threshold of the preset angle range during the sensing period.

8. The control system for bicycle direction light according to claim 1, wherein the direction light module disables the indication light when the sensing module senses that the turning angle of the user's head is larger than an upper threshold of the preset angle range during the sensing period.

9. The control system for bicycle direction light according to claim 1, wherein the direction light module turns on a corresponding indication light according to the turning direction of the user's head when the sensing module senses that the user is from a stopping state to a moving state and the turning angle of the user's head is larger than a lower threshold of the preset angle range during the sensing period.

10. The control system for bicycle direction light according to claim 1, wherein the direction light module disables the indication light when the sensing module senses that the turning angle of the user's head is increased to be larger than an upper threshold of the preset angle range, and afterward the turning angle is reduced to be less than a lower threshold of the preset angle range.

11. The control system for bicycle direction light according to claim 1, wherein the sensing period is three seconds.

12. The control system for bicycle direction light according to claim 1, wherein the preset angle range comprises a range between left turning 10 degree and 45 degree, and a range between right turning 10 degree and 45 degree, and the forward direction angle range comprises a range between left turning 10 degree and right turning 10 degree, and the head fitting is a safety helmet.

13. The control system for bicycle direction light according to claim 1, wherein the sensing module generates a plurality of acceleration sensing signal during the sensing period so as to sense the movement speed, the turning angle and the turning direction of the user's head.

14. A method for controlling a bicycle direction light, suitable for a bicycle and a head fitting, wherein the method comprises:
    setting a sensing module on the head fitting for sensing a movement speed, a turning angle, and a turning direction of a user's head; and
    controlling a bicycle direction light in accordance with the movement speed, the turning angle and the turning direction of the user's head during movement of the bicycle;
    wherein a direction light module turns on a corresponding indication light in accordance with the turning direction of the user's head when the sensing module senses that the turning angle is changed from the forward direction angle range to a preset angle range during a sensing period;
    wherein the sensing module determines whether the user performs an equipping action or a removing action in accordance with the movement speed of the head fitting, wherein the sensing module enters from a standby mode into a normal mode when the sensing module senses the equipping action, and the sensing module enters from the normal mode into the standby mode when the sensing module senses the removing action.

15. The method according to claim 14, wherein the indication light comprises a left direction light and a right direction light.

16. The method according to claim 15, wherein the direction light module turns on the left direction light and the right direction light when the sensing module senses that the user is from a moving state to a stopping state.

17. The method according to claim 15, wherein the direction light module controls the left direction light and the right direction light in accordance with the turning angle of the user's head when the sensing module senses that the user is from a stopping state to a moving state, wherein the direction light module disables the left direction light and the right direction light when the sensing module senses that the turning angle of the user's head is smaller than a lower threshold of the preset angle range during the sensing period.

18. The method according to claim 15, wherein the direction light module disables the left direction light and the right direction light when the sensing module senses that the user is from a stopping state to a moving state.

19. The method according to claim 14, wherein the direction light module disables the indication light when the sensing module senses that the turning angle of the user's head is smaller than the lower threshold of the preset angle range during the sensing period.

20. The method according to claim 14, wherein the direction light module disables the indication light when the sensing module senses that the turning angle of the user's head is larger than a upper threshold of the preset angle range during the sensing period.

21. The method according to claim 14, wherein the direction light module turns on a corresponding indication light according to the turning direction of the user's head when the sensing module senses that the user is from a stopping state to a moving state and the turning angle of the user's head is larger than the lower threshold of the preset angle range during the sensing period.

22. The method according to claim 14, wherein the direction light module disables the indication light when the sensing module senses that the turning angle of the user's head is increased to be larger than the upper threshold of the preset angle range, and afterward the turning angle of the user's head is reduced to be smaller than the lower threshold of the preset angle range.

23. The method according to claim 14, wherein the sensing period is three seconds.

24. The method according to claim 14, wherein the preset angle range comprises a range between left turning 10 degree and 45 degree, and a range between right turning 10 degree and 45 degree, and the forward direction angle range comprises a range between left turning 10 degree and right turning 10 degree, and the head fitting is a safety helmet.

25. The method according to claim 14, wherein the sensing module generates a plurality of acceleration sensing signal so as to sense the movement speed, the turning angle and the turning direction of the user's head.

* * * * *